Patented Feb. 18, 1936

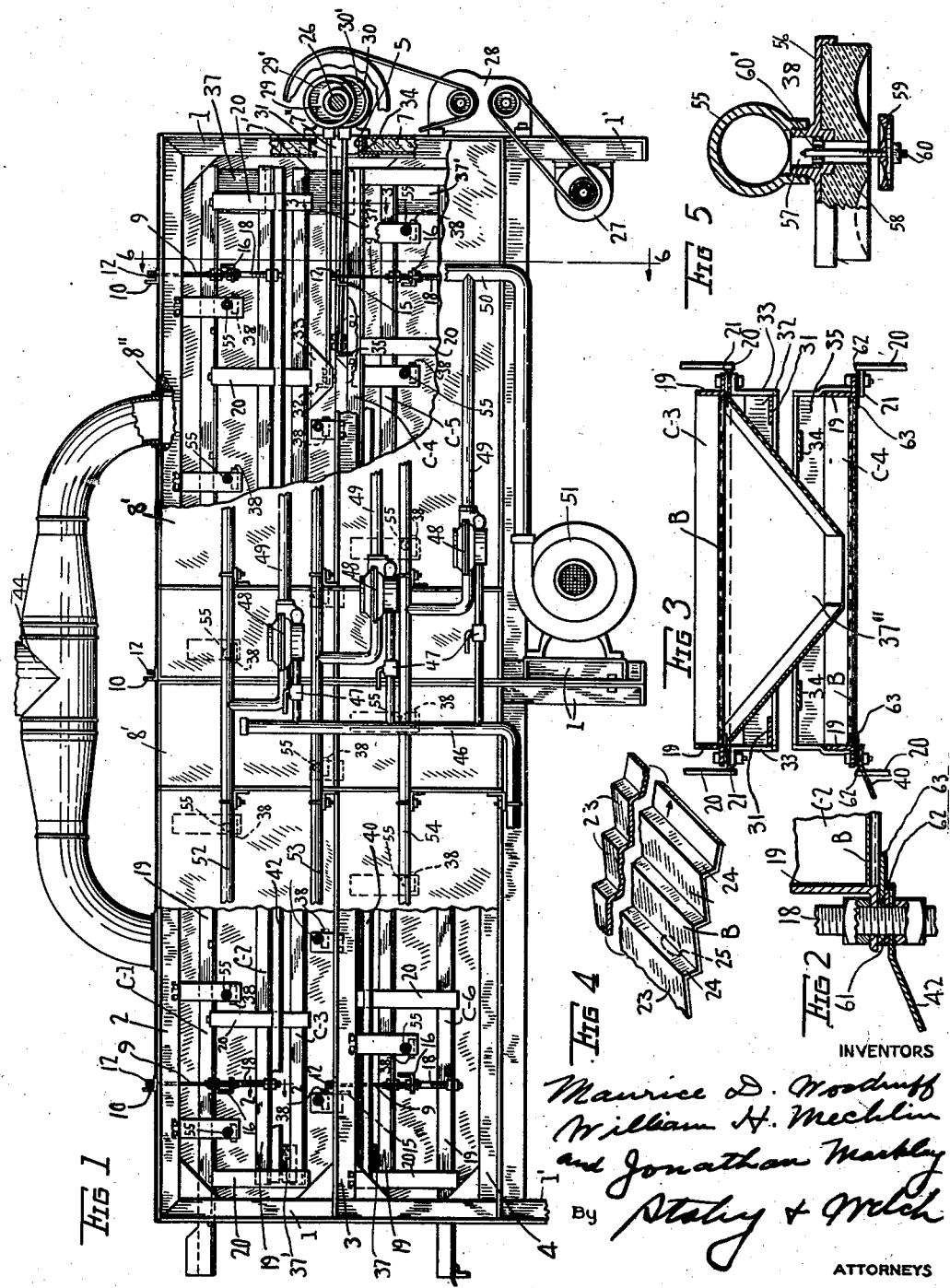

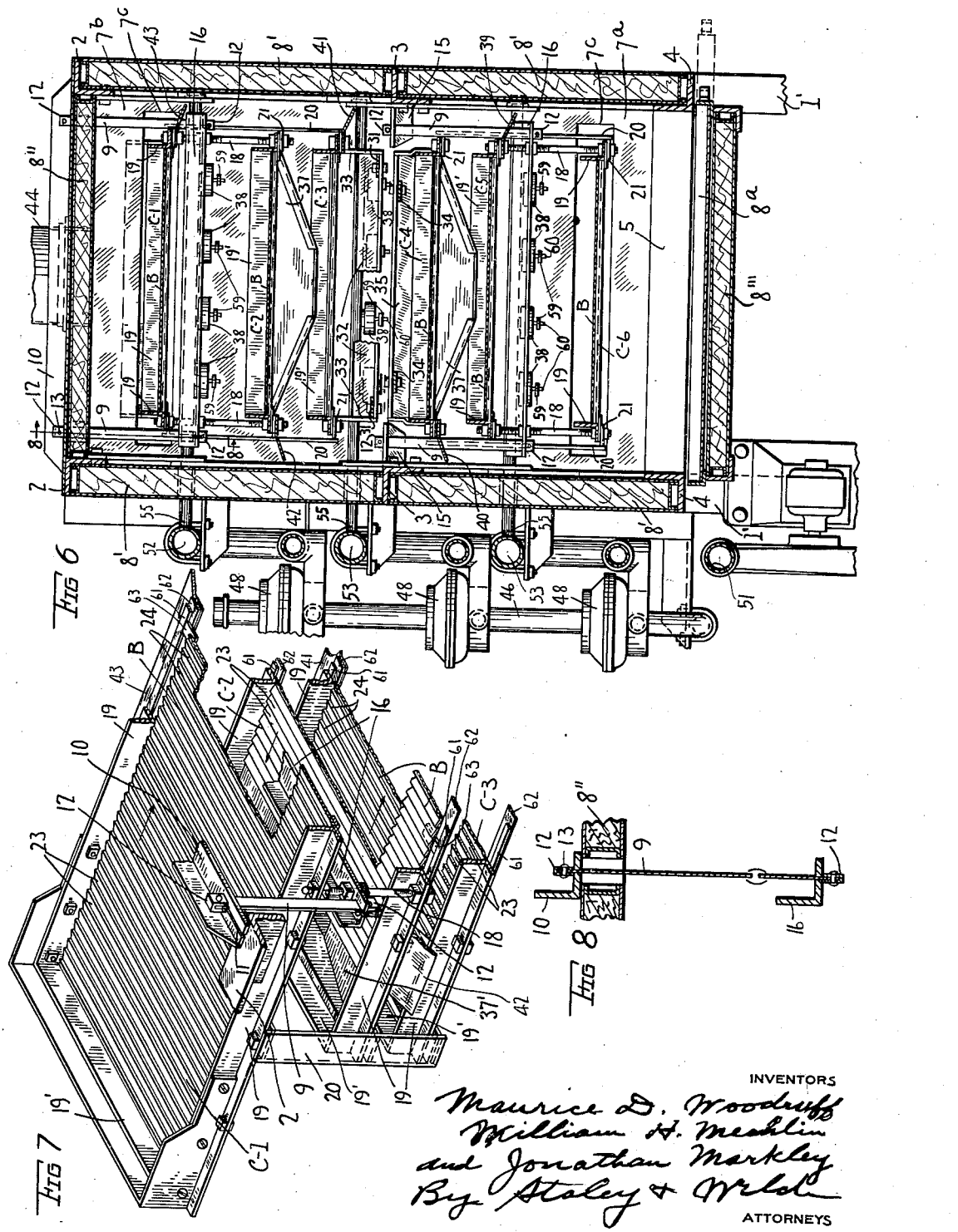

2,031,086

UNITED STATES PATENT OFFICE 2,031,086

ROASTING APPARATUS

Maurice D. Woodruff, William H. Mechlin, and Jonathan Markley, Springfield, Ohio, assignors to The Bauer Brothers Company, Springfield, Ohio, a corporation of Ohio Application December 21, 1933, Serial No. 703,436

1 Claim. (Cl. 34—38)

This invention relates to improvements in roasting machines adapted to roasting peanuts, cereals, coffee or similar materials in large amounts per unit of time, the invention particularly relating to that type of roaster having reciprocated conveyors and flame-heated radiant heaters disposed within the interior of the machine. For maximum economy and convenience in operation, the machine of the invention is preferably operated as a continuous roasting machine, as distinguished from the roasters of the batch type. However, its usefulness is not limited to continuous roasting, as the machine may also be operated as a simple dryer or heater.

In some of the earlier roasters, especially those in which inclined reciprocating conveyors are employed, the action thereof was so rough that losses occurred not only in the material being roasted but also in time and labor in culling out the damaged particles of material. One of the objects of the invention is the provision of a roasting machine in which the various operations of which it is capable are carried out with minimum damage to the material. For example, there is a demand for finished candy products of a better grade, in which, if peanuts are used, such nuts must be whole nuts, and to produce enough whole nuts in the early roasters entailed the culling out of a large amount of split nuts. By the action of the improved conveyors of the present invention, the advantages of which will be explained hereinafter, the proportion of split nuts delivered from the machine is greatly reduced.

Another object is to provide an improved form of shaking conveyor whereby a uniform rate of flow of the material thereover is secured regardless of the character of the material; that is, whether the particles of material are round or half round. In this connection it should be explained that with the inclined type of conveyor the tendency is for a round particle of material to flow thereover more freely than a half-round particle, resulting in an uneven flow of material where some particles are round and some half-round as in the case of peanuts.

Another object is to provide flame-heated radiant heaters disposed within the interior of the machine and of a character such that the material is not contaminated by contact with unburned products of combustion.

Another object is the provision of ducts whereby the material is delivered from one conveyor to a lower conveyor of such nature that a better mixture is obtained.

Another object is the provision of a suspension system for the conveyors, and a type of pitman connection connecting the driving eccentrics with the conveyors such that there are no moving parts that require lubrication, which is a great advantage in view of the heated interior of the machine.

Other objects and advantages will appear from the following description and claim and as illustrated in the accompanying drawings.

In the accompanying drawings:

Fig. 1 is a view of the improved roaster partly in side elevation and partly in longitudinal section.

Fig. 2 is an enlarged fragmentary vertical section on the line 2—2 of Fig. 1.

Fig. 3 is an enlarged vertical section on the line 3—3 of Fig. 1.

Fig. 4 is a fragmentary perspective view on an enlarged scale of a portion of the bottom of one of the conveyors.

Fig. 5 is an enlarged view partly in elevation and partly in vertical section of one of the heating devices.

Fig. 6 is an enlarged vertical section on the line 6—6 of Fig. 1.

Fig. 7 is an enlarged perspective view of a portion of one end of one of the reciprocating conveying units.

Fig. 8 is an enlarged vertical section on the line 8—8 of Fig. 6.

Referring to the drawings, the main frame of the apparatus consists of the vertical angle-section members 1 which are continued downwardly to provide legs 1', longitudinal members 2, 3 and 4 at the top, center and bottom of the frame proper, respectively, and transverse tie-members 5, one of which is shown in cross-section in the right hand end of Fig. 1, while another is shown in elevation in Fig. 6.

To prevent loss of heat by radiation, removable panel-like insulation members are secured to the sides, ends, top and bottom of the frame and thereby constitute a casing for the machine. At the right hand end of Fig. 1, portions of two end panels are shown in vertical section at 7 and 7', the upper member 7' being provided with an opening 7'' through which are passed pitman bars to be described later. At the opposite end of the machine, panels 7ª and 7ᵇ (Fig. 6) are employed, each having an elongated opening 7ᶜ whose purpose will also appear later. Side panels are indicated at 8', top panels at 8'' and bottom panels at 8''', all in Fig. 6. A plurality of chaff pans 8ª rests on the upper surfaces of the bottom members 8''' and are removable sidewise.

It is a usual practice in the design of roasting machinery to move the material through the machine in an inclined zig-zag path, the path being generally downward to utilize the force of gravity and being zig-zag to provide a sufficiently long path in a machine whose room space must be held to a minimum. Reciprocating conveyors are generally employed and these are usually tilted or sloped, the discharge end being lower than the receiving end. The action of sloping, reciprocating conveyors is not suitable for such material as peanuts, as the whole peanuts tend to roll too rapidly, due to the inclination of the conveyor alone, and the kernels are damaged. Further, whole nuts will feed faster than half-round halves of the nuts, resulting in a lack of uniform roasting.

In the present machine, reciprocating conveyors are employed but the conveyors are at all times horizontal and a flow of material toward the discharge ends thereof is induced by the peculiar formation of the bottom sheets of the conveyors. The advantages of the horizontal or level conveyor are that the material is moved in a uniform manner and rate of speed from end to end thereof, and does not roll or tumble in a manner tending to damage the same, and the length of time the material is exposed to the heat can be controlled to a closer degree by merely varying the speed of reciprocation of the conveyors.

In the present machine the mechanism necessary for providing reciprocating motion of the conveyors is reduced by grouping a plurality of the conveyors together to form a unit. Two such units are employed in the present machine, an upper and a lower unit. Each unit is independently suspended and reciprocated and the upper unit discharges into the lower unit. Since the units and their component conveyors are alike for the main part the description thereof which follows will be applicable to all parts except where noted, and the same reference characters for the parts will be used.

Each unit is suspended from the frame at six points, and on account of the difficulty of lubricating any sort of bearings in the heated interior of the roaster, a form of suspension has been devised and employed which eliminates all bearings and likewise eliminates all need of lubrication.

All of the suspension members are duplicates, and one member is best shown in Figs. 7 and 8. The suspension member is a comparatively thin strip 9, preferably of saw-steel, and is therefore comparatively flexible. Each of the suspension strips is so placed as to have its width dimension in a plane transverse to the path of motion of the conveyors so as to have a free to and fro swinging movement therefore since all the suspension members are equal in length, the unit will remain horizontal during its reciprocatory motions.

The upper unit is suspended from transversely disposed angle-section bars 10 secured to the upper surfaces of the top frame rail 2.

Each end of each of the suspension bars 10 is slotted inwardly as at 11 (Fig. 7) a short distance, the slot being just sufficient to accommodate a suspension strip 9, and each end of a suspension strip is provided with a head formed by riveting a U-shaped clip 12 thereto by a rivet 13, the heads preventing the strips from pulling through the slots 11 whereby the suspension strips are enabled to support the weight of the unit. As shown in Fig. 6 the bars 10 from which the upper unit hangs extend entirely across the machine. The lower unit is suspended from short angle-section members 15 secured at suitable intervals to the inner surface of the central frame rail 3 and extend inwardly toward the interior of the machine.

In each unit, connection with the suspension strips is made in the following manner: Between the upper conveyor C—1 and the central conveyor C—2 there is provided an angle-section bar 16 for each pair of suspension strips 9. The bars 16 extend transversely across the conveyors and each end projects beyond sufficiently to be in vertical alignment with the slots 11 in which the suspension strips 9 are hung and each end of each bar 16 is also slotted inwardly to receive the strips 9, each of which has secured to its lower end a head 12 similar to the head 12 at its upper end and upon which the bar 16 rests.

The bars 16 of a unit support that unit through its connection with the upper and central conveyors, there being a plurality of threaded rods 18 each of which is passed through the bars 16 and through the horizontal flanges of the angle iron side rails 19 of the intermediate conveyor, and held in place by nuts on the rods 18 engaging the upper and lower sides of the bars and rails through which the rods pass. By proper manipulation of the nuts on the rods the unit is brought to a lever position.

The lower conveyor C—3 of the upper unit is supported from the conveyors C—1 and C—2 just mentioned by means of vertical stays 20 to which are welded short horizontally disposed plates 21 (Fig. 2), the plates projecting inwardly and to which the side rails 19 of the conveyors are bolted.

Taking for description an individual conveyor and referring to Fig. 7, it will be seen that a conveyor frame consists of the longitudinal rails 19 previously referred to and end rails 19', and if desirable on account of the length thereof, the frame may be braced by additional cross-members suitably located, although none are shown in the present instance.

The bottom of each conveyor is especially formed as previously mentioned in order that level conveyors may be employed and still cause the material to be moved from one end to the other thereof. Referring to the detailed view, Fig. 4, wherein a portion of a conveyor bottom B is shown, it will be noticed that the sheet from which it is formed is corrugated with transversely disposed corrugations, one side 23 of each of which has a comparatively small angular relation with the horizontal and the other side 24 of which has a comparatively large angular relation with the horizontal, whereby a saw-tooth effect is obtained in cross-section. This results in a construction which has a plurality of closely positioned stepped surfaces, the purpose of inclining the surface 23 being to maintain all of said surfaces in the same horizontal plane and at the same time provide for walls 24 which form abutments to carry the material forwardly on the conveyor. When the conveyor is moved forwardly, this causes a movement of the material carried thereon in that direction, and when the conveyor is moved rearwardly inertia causes the material to ride upon an inclined surface 23 and drop onto the next succeeding inclined surface. In Fig. 4, a particle of material is represented at 25 as resting at the lower portion of an inclined surface 23. When the conveyor moves forwardly this particle will acquire sufficient momentum to slide upwardly by inertia along the sloping surface when the direction of the conveyor is reversed and to drop onto the next succeeding inclined surface 23.

Thus for each half of a reciprocation, the particles are advanced one or more corrugations, and it can be seen that with proper spacing of corrugations, and with suitable lengths of swing and with a correct rate of speed of reciprocation, that materials of all kinds will be positively moved along the conveyor, and as mentioned in connection with the roasting of peanuts, the movement may be of such an easy character as to prevent tendency to separate the kernel halves from one another.

Due to temperature changes in the roaster ranging from a cold to a highly heated roaster, the long conveyor bottom sheets B lengthen and contract to a considerable degree and to permit such expanding without troublesome buckling, the bottom sheets are supported in the following manner: Along the lower sides of each of the conveyor side rails 19 is secured a pair of long strips 61 and 62 (Fig. 2), one of which, 62, is wider than the strip 61 which is interposed between the rail 19 and the strip 62. The outer edges of the strips, however, are flush with each other, thereby leaving a narrow groove adjacent the inner edges of the conveyors. On the longitudinal edges of the bottom sheets B, is secured a plurality of small plates 63 spot welded to the bottom surface of the sheets at suitably spaced intervals and projecting outwardly a short distance as seen in Fig. 7. The plates 63 are slightly thinner than the spaces mentioned, therefore, the plates may slide along on the strips 62 according to the expansion or contraction of the sheets, this construction effectively preventing buckling in a heated conveyor bottom.

The reciprocating mechanism consists of a driven shaft 26, belt driven by an electric motor 27, Fig. 1, through a change speed device indicated conventionally at 28. The shaft 26 has secured thereon two pairs of eccentrics; in the present case, one eccentric only of each pair is shown in Fig. 1. The eccentric 29 and its mate (not shown) are keyed to the shaft in exactly similar angular relation and are connected to the upper reciprocating unit by means to be described. For purposes of balance the eccentrics which are connected to and reciprocate the lower unit, are placed on the shaft and keyed thereto at 180 degrees displacement from the abovementioned eccentrics. One eccentric of the lower unit pair is shown at 30.

For the same reason that the suspension means involves the use of flexible strips to avoid lubricating difficulties due to locating bearings in the heated interior of the machine casing, ordinary pitman bearings usually associated with eccentric drives are here eliminated. In the present machine, each of the pitmen is a flat strip 31, preferably of spring steel, one end being attached directly to the strap 29' surrounding the corresponding eccentric and the other end being attached directly to its corresponding unit, and passing through an opening 7" previously mentioned in the end insulating member 7'. The flexibility of the connecting bar is sufficient to serve in exactly the same manner as a pivoted bearing and obviously with no need of providing lubrication for the parts. The pitman bars 31 transmit motion to the upper unit from their eccentrics, these pitman bars being connected by bolts to one leg of an angle-section member 32 which is welded at each end to the plates 33 which are secured to and extend downwardly from the lower surfaces of the conveyor side rails 19 of the lowermost conveyor of the upper unit. In a similar manner, the lower unit receives its reciprocating movements from eccentrics, one of which only is shown at 30, Fig. 1, through the connection with the straps 30' thereof of pitman bars in the form of flexible strips of spring steel 34. These bars extend from the eccentrics and are connected to a bar 35 secured to the upper conveyor C—4 of the lower unit (Figs. 1 and 6) and like the bars 31 pass through the opening 7". The relative locations of the pitman bars are shown in Fig. 3.

In the present machine, the conveyors are so arranged that the material to be roasted is deposited on the uppermost conveyor C—1 on an extension thereof at the left of Fig. 1, this conveyor being extended beyond the casing for this purpose through the opening 7c in the left end insulating panel 7b previously mentioned. The travel of material in this conveyor is necessarily to the right, therefore the corrugated sheet B is accordingly placed to produce this travel. At the right or discharge end of this conveyor, the material is discharged, through a chute shown conventionally at 37 (Fig. 1) to the right hand end of the next lower conveyor C—2. Here the travel of material is to the left and the bottom sheet B is accordingly reversed as compared to the conveyor C—1. At the left-hand end of the conveyor C—2 the material enters another chute 37' and is conveyed to the left-hand end of the lower conveyor C—3 of that unit which has the corrugations of its bottom B again reversed to convey the material to the right. From the lower conveyor C—3 of the upper unit, the material is discharged through a chute 37" to the upper conveyor C—4 of the lower unit and the operation is repeated. It will thus be seen that the top and bottom conveyors of a unit move the material in one direction and the intermediate conveyor of that unit in the opposite direction by suitable positioning of the bottom sheets B as shown by the partial showing of three conveyors in Fig. 7.

The chutes not only deliver the material from one conveyor to another but also act to bring about a uniform roasting operation by the manner in which the material is mixed while passing therethrough and caused to assume new positions on the succeeding conveyors. To that end each chute is formed with inclined side walls, as shown in connection with the chute 37" so that two streams of the material will cross each other at the discharge end of the chute and thoroughly mix the material.

The lower reciprocating unit is so much a duplication of the upper unit that no further detailed description of the same is thought necessary, except to state that delivery of finished material from the machine is made from the left end of the lowermost conveyor C—6 which, like the uppermost receiving conveyor, extends entirely without the machine casing (Fig. 1) through the opening 7c in the lower insulating panel 7a as shown in Fig. 6, and discharges into a material-cooling device such as is shown and described in Letters Patent No. 1,958,291, dated May 8th, 1934.

The means for supplying the required heat to the present roaster comprises a plurality of series of flame-heated radiant burners and the essential control apparatus, blowers and the like, a large proportion of which is eliminated from the present drawings. As shown in Figs. 1 and 6, a plurality of series of burners 38 are arranged transversely in a horizontal plane in the space between the top and intermediate conveyors C—1 and C—2 of the upper unit. A plurality of series of similar burners 38 are located between the conveyors C—3 and C—4, and a plurality of series of similar burners between the conveyors C—5 and C—6.

These burners are of a type which reflect a radiant form of heat instead of imparting heat by flame temperature, and by their construction are better enabled to consume practically all the fuel mixture applied to them, which is advantageous for the present purposes in that radiant heat provides a more uniform roasting process, penetrating the material deeply without danger of scorching the outer surface, while the absence of excess unburned gases prevents contamination of the material and thereby spoiling the flavor.

It will be observed that the burners are arranged at three levels in the present machine. The upper burner, besides directing radiant heat upon the material passing over the conveyor C—2, heats the corrugated bottom of the initial conveyor C—1, and the heat of this conveyor acts to dry the material as it enters the machine. The intermediate burner directs radiant heat upon the material passing over the conveyor C—4 but merely heats the bottom of the conveyor C—3, while the lower burner directs radiant heat upon the material passing over the final conveyor C—6 and heats the bottom of the conveyor C—5. While in the present case, therefore, there are six conveyors, the radiant heat is directed upon the material while passing over but three of the conveyors. The location of the burners is well adapted to roasting material fed through the machine from top to bottom, as the cooler raw material enters the machine where the contained heat is greatest and as the material reaches lower stages in the machine, less heat is encountered, until on the lowermost conveyor C—6 the material is exposed to the heat of the burners only which finish off the material with radiant heat alone.

To more efficiently employ the heat generated by the burners, a series of baffles is employed to divert the heat from side to side. For example, referring to Fig. 6, there is attached to the lower edge of the right hand side of the conveyor C—5 immediately above the lowermost series of burners, a metallic baffle 39 extending the full length of the conveyor and projecting laterally to within a short distance from the inner surface of the side of the machine. Therefore, the heated air rising under the conveyor C—5 can not rise up along the right-hand side of the casing, but must travel laterally to the left, and on rising along the left side, a second baffle 40 is encountered attached in a similar manner to the left-hand lower edge of the conveyor C—4. The baffle 40 then diverts the flow to the right and in a repetition of the diversion of flow as caused by the remaining baffles shown at 41, 42 and 43, the heated air is forced to travel upwardly in a zig-zag path as shown by the arrows until the air is finally withdrawn from the casing through the flues 44 by means of natural draft or a suction fan (not shown). The baffles are notched to accommodate the vertical stays 20.

When gas is used for the fuel, the gas enters through the vertical manifold 46 from which it is delivered through the small pipes having he valves 47 to mixing devices shown conventionally at 48 where it is mixed with air under pressure entering from the air pipes 49 leading from the pressure manifold, a portion only of which is indicated at 50. An electric blower 51 supplies the air under pressure to the air manifold.

The burners are supported on pipes which carry the mixture to them. Referring to Fig. 1, the fuel mixture manifolds are indicated at 52, 53 and 54, each being horizontally and longitudinally disposed on the exterior of the machine casing. To each of the mixture manifolds are attached at proper intervals pipes 55 extending into the interior of the casing laterally through suitably spaced openings in the panels 8' on that side. To the under side of each of the pipes 55 is attached one or more of the burners.

Each of the burners comprises a metallic disk 56 (Fig. 5) having a hollow centrally located boss 57 externally threaded so as to be screwed into a threaded opening in the corresponding pipe 55. On the opposite side of the disk is attached a disk 58 of refractory material having a central opening communicating with the bore of the hollow boss, through which the mixture is forced. A small adjustable circular baffle plate 59 is threaded on a centrally located stem 60 suspended from a spider 60' mounted on a shoulder in the orifice of the metallic disk 56. The mixture issuing from the opening in the disk impinges on the small baffle so that the mixture is turned back to pass across the face of the refractory disk. The disk is so formed as to have an annular, concave surface extending from the opening at the center to the periphery of the disk, and when lighted the burning mixture follows this concave surface to the outer edge when proper adjustment of the baffle is made. The flame heats the refractory disk according to the temperature desired with little gas consumption, and the heat reflected therefrom is largely radiant heat which is most effective for the purposes as described.

Having thus described our invention, we claim:

In an apparatus of the character described, a conveyor for material consisting of a frame and a bottom member of sheet metal formed separately from the frame, said frame having longitudinally extending grooveways, and projections on said bottom loosely extending into said grooveways to support said bottom from said frame and to permit expansion and contraction of said bottom relatively to said frame.

MAURICE D. WOODRUFF.
WILLIAM H. MECHLIN.
JONATHAN MARKLEY.